United States Patent [19]

Hartz et al.

[11] Patent Number: 4,687,071
[45] Date of Patent: Aug. 18, 1987

[54] MOUNTING FOR TRACK LAYING VEHICLE TRANSMISSION

[75] Inventors: James F. Hartz; Rayman E. Bazilio, both of Indianapolis; Michael R. Ferguson, Brownsburg, all of Ind.

[73] Assignee: General Motors Corporation, Detroit, Mich.

[21] Appl. No.: 867,222

[22] Filed: May 27, 1986

[51] Int. Cl.[4] ............................................. B60K 17/00
[52] U.S. Cl. ..................................... 180/9.1; 74/405; 74/606 R; 123/DIG. 6; 180/11; 180/70.1; 180/297; 180/298; 180/299; 180/312; 280/781
[58] Field of Search ............... 180/311, 312, 298, 299, 180/294, 291, 297, 70.1, 9, 9.1, 11, 75.2; 74/606 R, 391, 405, 785; 123/2, DIG. 6, DIG. 7; 403/401; 280/781

[56] References Cited

U.S. PATENT DOCUMENTS

| | | | |
|---|---|---|---|
| 1,126,592 | 1/1915 | Twombly | 180/294 |
| 1,893,609 | 1/1933 | Austin | 180/294 |
| 2,413,264 | 12/1946 | Swennes et al. | 180/294 |
| 3,710,885 | 1/1973 | Brown | 180/294 |
| 3,744,331 | 7/1973 | Caldwell | 74/405 |
| 4,231,708 | 11/1980 | Telesio | 180/298 |
| 4,276,952 | 7/1981 | Kuhfuss, Jr. et al. | 180/294 |
| 4,499,786 | 2/1985 | Ballheimer | 74/606 R |
| 4,523,655 | 6/1985 | Keenan et al. | 180/009 |
| 4,593,786 | 6/1986 | Tate | 180/312 |

OTHER PUBLICATIONS

Automotive News, Centennial Celebration Issue, Oct. 30, 1985, p. 284.

Primary Examiner—John J. Love
Assistant Examiner—Everett G. Diederiks, Jr.
Attorney, Agent, or Firm—Saul Schwartz

[57] ABSTRACT

A mounting for the transmission of a track laying vehicle wherein the transmission is longitudinally installed and removed from a power-pack compartment in the hull of the vehicle. The mounting includes a pair of collars slidably disposed on bosses on opposite sides of the transmission case for movement between laterally inboard and outboard positions. As the transmission is pushed into the power-pack compartment, the collars are in the retracted positions. When the transmission achieves an installed position with the collars aligned on the sprocket axis of the hull, the collars are moved to the extended positions wherein an external bearing surface on each collar engages an internal cylindrical pilot surface on a web adapter rigidly attached to the adjacent hull wall. The transmission is supported at the sprocket axis through the collars.

7 Claims, 8 Drawing Figures

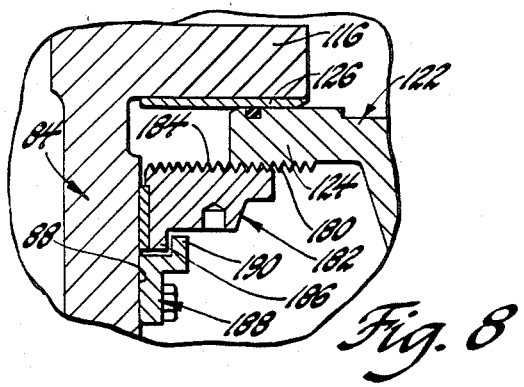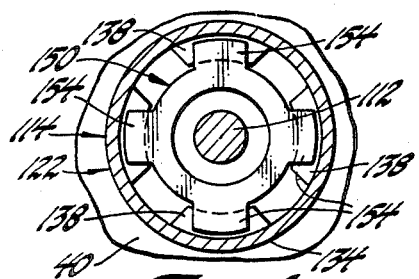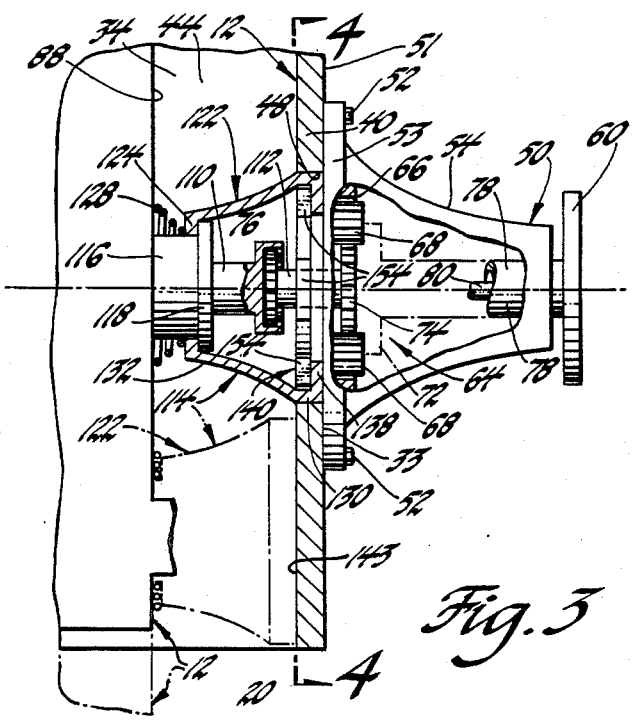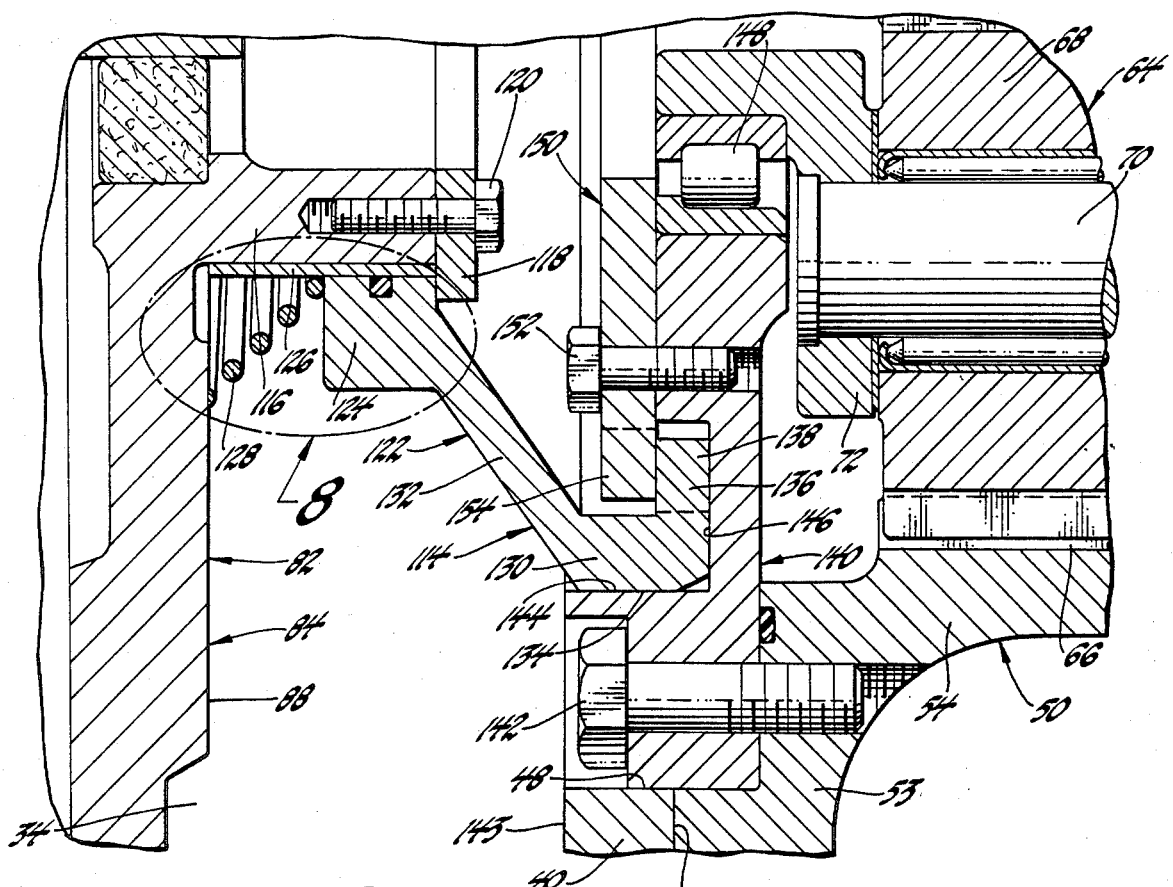

4,687,071

MOUNTING FOR TRACK LAYING VEHICLE TRANSMISSION

The invention herein described was made in the course of work under a contract or subcontract thereunder with the Department of Denfense.

BACKGROUND OF THE INVENTION

1. Field of the Invention

This invention relates generally to track laying vehicles and, more particularly, to a mounting for supporting the engine/transmission system of the vehicle on the hull of the vehicle.

2. Description of the Prior Art

Track laying vehicles, such as military tanks, typically have cross drive transmissions and/or engine/transmission power-packs installed and removed vertically. Because it is advantageous to support such transmissions on the hull walls at the sprocket axis of the hull, cross drive transmission cases typically have external cylindrical bosses surrounding the transmission output shafts which rest in semicylindrical saddles on the hull walls aligned on the sprocket axis. Saddle caps bolt to the saddles over the bosses to restrain the latter in the upward vertical direction. Removal of such transmissions, especially in the field, requires heavy crane type lifting equipment. While prior proposals have suggested horizontally or longitudinally installing and removing transmissions or engine/transmission units from various types of vehicles, none has suggested a transmission mounting according to this invention whereby a cross drive transmission, longitudinally installed and removed, conveniently retains the advantages of vertical support of the transmission at the sprocket axis. The transmission mounting according to this invention, therefore, represents a novel alternative to heretofore known mountings in an environment where the transmission is installed and removed longitudinally.

SUMMARY OF THE INVENTION

The primary feature, then, of this invention is that it provides a new and improved transmission mounting for a longitudinally installed and removed cross drive transmission in a track-laying vehicle. Another feature of this invention resides in the provision in the new and improved transmission mounting of a pair of collar assemblies between the hull walls and adjacent the sides of the transmission case, the collar assemblies including sliding collars which are retracted during transmission installation and removal and extended when the transmission achieves an installed position to engage pilots on the hull walls to support the transmission on the hull walls. Still another feature of this invention resides in the provision in the new and improved transmission mounting of pilots on the hull walls which are substantially flush with an inner surfaces of the hull walls so that maximum usage of the transmission compartment in the transverse or width direction can be achieved both forward and aft of the pilots on the hull walls. Yet another feature of this invention resides in the provision in the new and improved transmission mounting of a pair of final drive assemblies bolted to outer surfaces of the hull walls over apertures in the latter, each final drive assembly having a web adapter thereon defining the pilot for the corresponding one of the slidable collars. A still further feature of this invention resides in the provision in one embodiment of the new and improved transmission mounting of breech-block type locks on the pilots and on the slidable collars which engage in the extended positions of the collars when the latter are rotated relative to the pilots and which prevent withdrawl of the collars to the retracted positions.

DESCRIPTION OF THE DRAWINGS

FIG. 3 is a schematically illustrated fragmentary plan view taken generally along the plane indicated by lines 3—3 in FIG. 2;

FIG. 4 is a schematically illustrated sectional view taken generally along the plane indicated by lines 4—4 in FIG. 3;

FIG. 5 is an enlarged fragmentary sectional view of a portion of the transmission mount schematically illustrated in FIG. 1-FIG. 4;

FIG. 8 is a view of the portion of FIG. 5 within the aisle identified by the number 8 but showing a system for shifting the collars laterally.

DESCRIPTION OF THE PREFERRED EMBODIMENT

Figure 1:
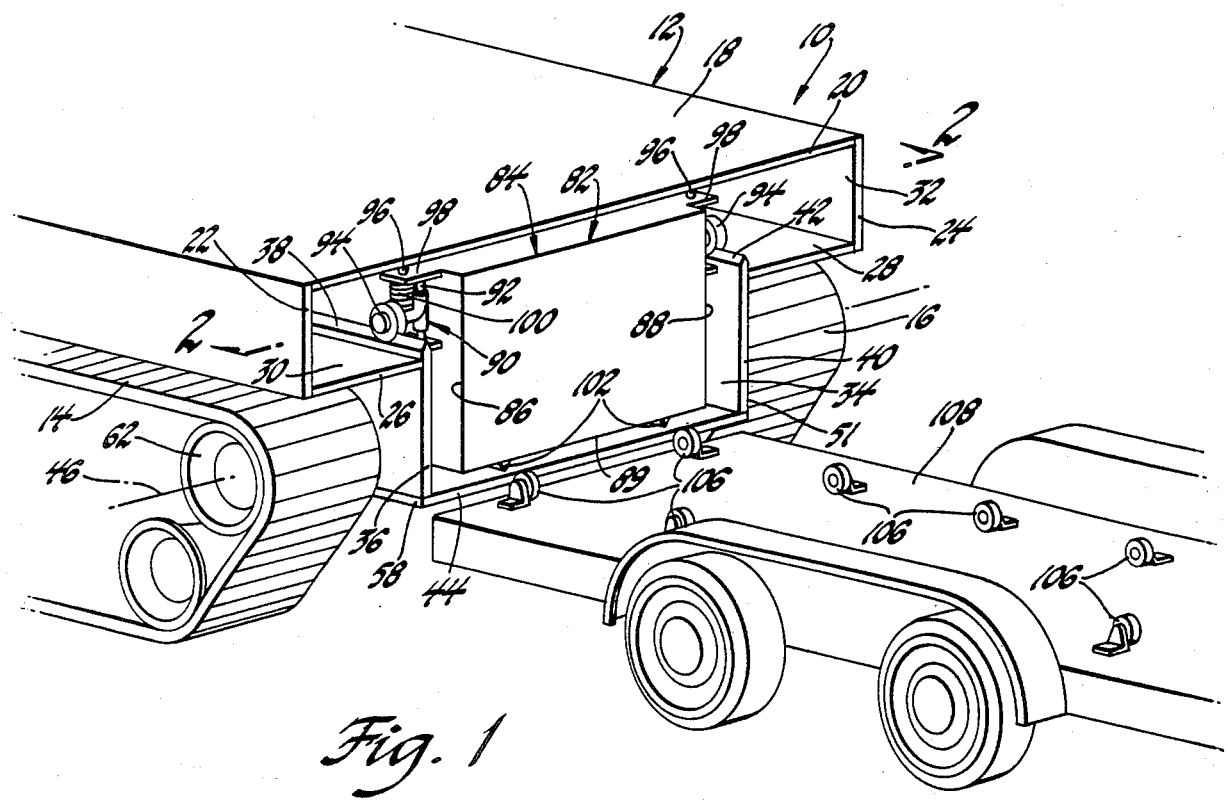
FIG. 1 is a schematically illustrated fragmentary perspective view of the aft portion of a track laying vehicle having a longitudinally installed and removed power pack incorporating a transmission mounting according to this invention.
Figure 2:
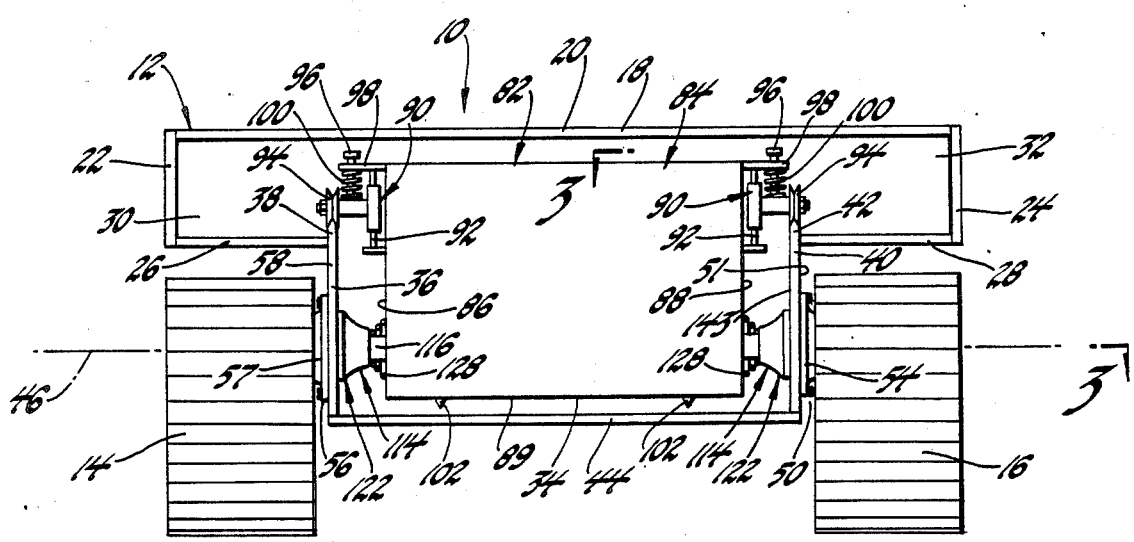
FIG. 2 is a schematically illustrated elevational view taken generally along the plane indicated by lines 2—2 in FIG. 1.

Referring now to FIGS. 1 and 2 of the drawings, a track laying vehicle 10 includes a hull 12, a left crawler track 14 and a right crawler track 16. The hull has a schematically illustrated upper aft deck 18 terminating at an aft end 20 of the hull. The upper deck 18 extends across the full width of the vehicle and cooperates with a left outside panel 22, a right outside panel 24 and a pair of horizontal panels 26 and 28 above the tracks in defining a left sponson box 30 and a right sponson box 32. The sponson boxes open inwardly toward a power pack compartment 34 of the hull. A left vertical hull wall 36 has an upper edge 38 extending above the horizontal panel 26 and defines the left side of the power pack compartment. A right vertical hull wall 40 has an upper edge 42 extending above the horizontal panel 28 and defines the right side of the power pack compartment. A lower aft deck 44 parallel to the upper deck 18 extends between the vertical walls 36 and 40 and defines the floor of the power-pack compartment. For simplicity, the sponson boxes and the power-pack compartment are illustrated as open at the aft end 20 of the hull. In practice, the aft end is closed by door conveniently hinged on the hull for swinging movement between closed positions covering the sponson boxes and the paper-pack compartment and open positions exposing the same for assembly and service.

Referring particularly to FIGS. 1, 2 and 3, each of the vertical hull walls 36 and 40 has an aperture therein aligned on a transverse sprocket axis 46 of the hull, only an aperture 48 in right hull wall 40 being shown in FIGS. 3 and 5. A right final drive assembly 50, FIGS. 2, 3, and 5, is rigidly attached to an outer surface 51 of the right vertical hull wall 40 over the aperture 48, as for example by a circumferential array of bolts 52 extending through a flange 53 of housing 54 of the final drive assembly. An identical left side final drive assembly 56, FIG. 2, having a housing 57 is similarly attached to an outside surface 58 of the left vertical hull wall 36. The housing 54 of the final drive assembly 50 supports a sprocket attachment flange 60, FIG. 3, for rotation about the sprocket axis 46. The attachment flange is rigidly connected to a right side track drive sprocket, not shown, which drives the track 16. The housing 57 of the final drive assembly 56 has a similar sprocket attachment flange supported thereon for rotation about the sprocket axis 46. A left side track drive sprocket 62, FIG. 1, is connected to the attachment flange on the final drive assembly 56 and drives the track 14.

The gearing within the final drive assembly 50 is schematically illustrated in FIG. 3 and partially illustrated in more detail in FIG. 5. Referring to FIGS. 3 and 5, the internal final drive gearing includes a planetary gear set 64 having a ring gear 66 integral with the housing 54, a plurality of planet gears 68 rotatably supported on a corresponding plurality of pins 70 on a carrier 72, and a sun gear portion 74 of a final drive input gear 76, FIG. 3. The carrier 72 is rotatable about the sprocket axis 46 and is rigidly connected to the attachment flange 60 by a schematically illustrated tubular connecting member 78. The input gear 76 is also rotatable about the sprocket axis 46 so that the sun gear drives the planet gears 68 and the carrier 72 to effect rotation of the attachment flange 60 through a final drive gear reduction. A schematically illustrated control rod 80 is aligned on the sprocket axis 46 and extends from laterally outboard of the attachment flange 60 to the input gear 76 and functions to translate the input gear laterally. Reference may be made to U.S. Patents Nos. 3,504,563 to J. C. Polak; 3,504,564 to N. B. Kell; and 4,491,037 to B. L. Bullock, all assigned to the assignee of this invention, for detailed descriptions of similar final drive assemblies.

As seen best in FIGS. 1 and 2, a cross drive transmission 82 is disposed in the power-pack compartment 34 and is adapted for longitudinal installation and withdrawal through the aft end 20 of the hull. The transmission 82 is schematically illustrated and representative of the circumscribed rectangular volume of the engine/transmission power-pack which may include coolers, exhausts, air filters and the like. More particularly, the transmission 82 has a rigid housing or case 84 defining a left vertical side 86, a right vertical side 88, and a bottom 89 extending therebetween. A plurality of roller spindles are supported on each of the left and right sides 86 and 88 of the case 84 for limited vertical movement on a corresponding plurality of vertical trunnions. Only a pair of aft roller spindles 90 on a corresponding pair of aft vertical trunnions 92 are illustrated in FIGS. 1 and 2. The roller spindles rotatably support respective ones of a plurality of rollers adapted to ride on corresponding ones of the upper edges 38 and 42 of the vertical hull walls 36 and 40, only a single pair of roller 94 on the aft roller spindles 90 being illustrated in FIGS. 1 and 2. The roller spindles 90 are adjustable vertically relative to the case 84, as for example by a pair of bolts 96 rotatably connected to the roller spindles and threaded into a corresponding pair of flanges 98 integral with the case 84. A pair of compression springs 100 are disposed between the roller spindles and the flanges 98.

With continued reference to FIGS. 1 and 2, a pair of guide tracks 102 are rigidly attached to the bottom 89 of the transmission case 84 and extend parallel to each other and to a longitudinal axis of the hull 12. The guide tracks 102 cooperate with a plurality of axially aligned rollers 106 on a mobile support platform 108. When the platform 108 is positioned adjacent the aft end 20 of the hull and rigidly secured to the latter with the rollers 106 in alignment with the guide tracks 102, the cross drive transmission 82 or the complete engine/transmission power-pack can be translated rearwardly through the open aft end of the power-pack compartment from an installed position within the power-pack compartment, FIGS. 1–3, onto the mobile support platform 108 or vice versa. During removal, the tracks 102 engage the rearwardmost ones of the rollers 106 on the platform 108 before the aft rollers 94 on the case 84 reach the aft ends of the upper edges 38 and 42 of the vertical hull walls. Accordingly, the transmission portion is fully vertically supported as it transits the interface between the hull and the mobile platform 108. The transmission and/or the complete power-pack may thus be removed and installed either initially or in the field without heavy crane-type vertical lifting equipment.

The cross drive transmission 82 has a single power input, not shown, and internal gearing whereby the power input is divided between a pair of output shafts aligned on a transverse axis of the transmission which coincides with the sprocket axis 46 in the installed position of the transmission, only a right side output shaft 110 being schematically illustrated in FIG. 3. The output shaft 110 may, for example, have internal splines at one end thereof slidably engaged by corresponding plurality of external splines on a connecting portion 112 of the final drive input gear 76 whereby the rotary power output at the output shaft 110 is directed through the planetary gear set 64 to the connecting flange 60 and the track drive sprocket. The control rod 80 functions to shift the input gear 76 laterally along the sprocket axis 46 between a normal active position wherein the input gear connects the output shaft 110 to the planetary gear set 64 and an inactive position shifted laterally outboard of the active position wherein the connecting portion 112 of the input gear is disconnected from the output shaft 110. The input gear 76 is typically shifted to the inactive position when the vehicle is towed an extended distance so that the crawler tracks do not back-drive the transmission gearing through the sprockets and final drive assemblies.

According to this invention, the rearward or aft end of the engine transmission power-pack is conveniently mounted on the vertical hull walls 36 and 40 at the sprocket axis 46 by a pair of collar assemblies 114. Referring particularly to FIGS. 3, 4 and 5, and describing only the right side one of the collar assemblies 114, the latter includes a right cylindrical boss 116 on the right side 88 of the case 84 and an annular retaining ring 118 affixed to the outboard end of the boss 116 by an array of bolts 120. The collar assembly 114 further includes a slidable collar 122 having an inboard hub 124 journaled on a cylindrical bearing sleeve 126 around the boss 116 between the retaining ring 118 and the right side 88 of the transmission case. The collar 122 is slidable between an extended position, FIGS. 3 and 5, with the hub 124 adjacent the retaining ring 118 and a retracted position, shown in phantom line in FIG. 3, with the hub 124 adjacent the right side 88 of the transmission case. A spring 128 around the boss 116 is located between the case and the collar 122 and biases the latter toward the extended position. The collar 122 has an outer cylindrical lip 130 connected to the hub 124 by an integral frustoconical body portion 132. The lip 130 has an outer cylindrical surface 134 and an integral inturned flange 136 which extends around the collar but which is cut away to define a plurality of circumferentially spaced radially inward extending locking lugs 138, FIG. 4.

The collar assembly 114 further includes an annular web adapter 140 disposed in the aperture 48 in the right vertical hull wall 40 and connected to the hull wall through the final drive assembly 50 by an annular array of bolts 142. The web adapter 140 is flush with an inner surface 143 of the wall 40 and includes a groove which defines cylindrical internal pilot surface 144 and an annular bottom surface 146. A bearing 148 between the web adapter 140 and the carrier 72 of the planetary gear set 64 in the final drive assembly 50 provides an inboard support for the planet carrier. An annular lug plate 150 is rigidly attached to the web adapter 140 by a circumferential array of bolts 152 the heads of which are generally flush with the inner surface 143 of the wall 40. The lug plate includes a plurality of circumferentially spaced radially outward extending locking lugs 154. The spacing between the locking lugs 154 is sufficient to permit passage therebetween of the locking lugs 138 on the collar 122.

In a typical installation sequence, the power-pack is transported to the hull 12 on the mobile platform 108 and positioned adjacent the aft end 20 of the hull and secured by any conventional means to the latter. The roller spindles 90 are adjusted to align the rollers 94 with the upper edges 38 and 42 of the vertical hull walls 36 and 40 and the power-pack is manually or hydraulically pushed toward the vehicle on the rollers 106. The collars 122 are held in the retracted positions during the initial phases of the installation procedure as the power-pack is pushed from the mobile platform 108 into the power-pack compartment 34.

At an intermediate position of the transmission 82, shown in broken lines in FIG. 3, the collars 122 can be released to engage and slide on the inner surfaces of the hull walls. Because the web adapters are generally flush with the inner surfaces of the hull walls, the power-pack or accessories thereon can extend almost the full width of the power-pack compartment 34 for maximum volume utilization.

The power-pack is pushed forward in the hull until the transverse axis of the cross drive transmission 82 is aligned in a transverse vertical plane of the hull containing the sprocket axis 46. Then, the adjusting bolts 96 are rotated to raise or lower the aft end of the power-pack until the transverse axis of the transmission coincides with the sprocket axis 46. The collar 122 is rotated to angularly index the locking lugs 138 thereon with the spaces between the locking lugs 154 on the lug plate 150. The collar 122 is shifted laterally outboard to the extended position wherein the laterally outboard edge of lip 130 bottoms against the bottom surface 146 of the groove in the web adapter 140 while the outer cylindrical surface 134 on the lip 130 slidably engages the pilot surface 144 on the web adapter. In the extended position thereof, the collar 122 is rotated in breech-lock fashion about the sprocket axis 46 until the locking lugs 138 are disposed between the bottom surface 146 on the web adapter 140 and the locking lugs 154 on the lug plate 150. The collar 122 is thus restrained laterally relative to the hull wall and vertically by the pilot surface 144. The bolts 96 are then further adjusted to lift the rollers 94 from the upper edges 38 and 42 of the hull walls thereby rendering the collars 122 the sole means of vertical support for the aft end of the power-pack at the sprocket axis 46 of the hull. When the collars 122 are both fastened in their extended positions, the remaining rings 118 operate to laterally locate the transmission between the hull walls.

Figure 6:
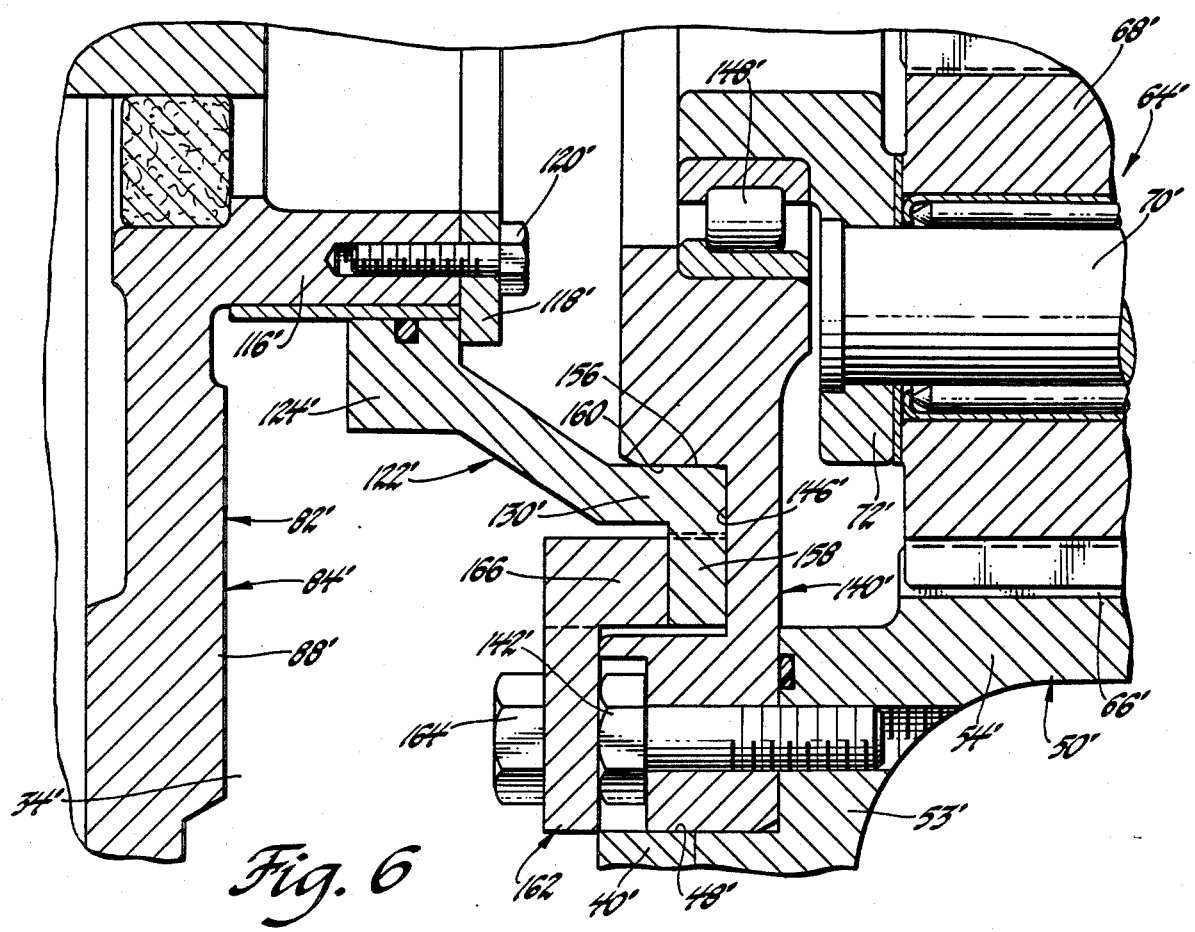
FIG. 6 is similar to FIG. 5 but showing a first modified version of the transmission mounting according to this invention.

FIG. 6 illustrates a first modified embodiment of the transmission support according to this invention. For brevity and simplicity, elements common to the modified embodiment and the preferred embodiment and described hereinbefore are identified with corresponding reference characters primed. The first modified mounting includes a collar 122' having an inboard hub 124' slidably journaled on a boss 116' of the transmission case whereby the collar is slidable between a retracted position adjacent the transmission case and extended position abutting a retaining ring 118' on the boss. The collar 122' has an outer cylindrical lip 130' defining an inner cylindrical surface 156 and a flange 158 around and extending radially out from the lip. The flange 158 is interrupted at regular intervals around the circumference of the lip to define a plurality of radially outward extending locking lugs, not shown, similar to the locking lugs 138 on the collar 122 of the preferred embodiment.

The first modified mounting further includes an annular web adapter 140' having a face groove therein defining a bottom surface 146' and an outer cylindrical pilot surface 160. An outer annular lug plate 162 is rigidly attached to the web adapter 140' by an annular array of bolts 164. The lug plate 162 has an inturned flange 166 therearound which is recessed at circumferentially spaced intervals to define a plurality of radially inward extending locking lugs spaced to permit passage therebetween of the locking lugs of the collar 122'. The installation of the power-pack and the operation of the modified mounting is as described hereinbefore except that in the extended position of the collar 122' the inner cylindrical surface 156 thereon slidably engages the outer pilot surface 160 on the web adapter 140' to effect vertical support of the aft end of the power-pack on the hull wall.

Figure 7:
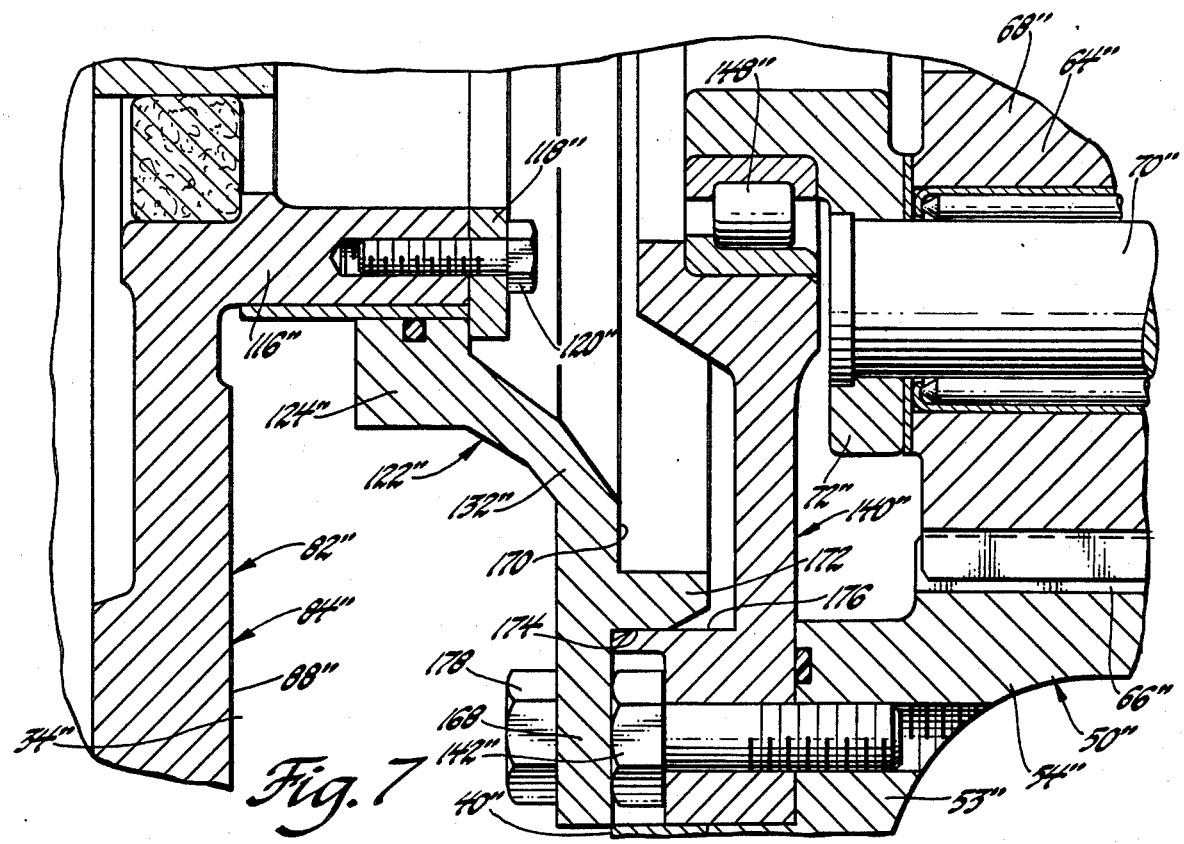
FIG. 7 is similar to FIG. 5 but showing a second modified version.

FIG. 7 illustrates a second modified embodiment of the transmission mounting according to this invention. Elements common to the modified embodiment and the preferred embodiment described hereinbefore are identified with the corresponding reference characters twice primed. The second modified embodiment includes a collar 122" having an inboard hub 124" disposed on a boss 116" of the transmission case 84" for sliding movement between a retracted position adjacent the case and that extended position abutting a retaining ring 118" on the boss. The collar 122" has a generally frustoconical body portion 132" and an integral radially outward extending flange 168. The flange 168 has an inner surface 170 from which extends a right circular flange 172 defining an outer cylindrical surface 174. An annular web adapter 140" bolted to the final drive assembly 50" has an internal cylindrical pilot surface 176 slidably engaged by the outer cylindrical surface 174. An annular array of bolts 178 applied from between the hull wall 40" and the transmission case 84" function to rigidly attach the collar 122" to the web adapter 140". Again, the installation of the power-pack and the operation of the modified mounting are as described hereinbefore except that support of the power-pack at the sprocket axis 46 is between the outer cylindrical pilot surface 174 on the collar and the internal cylindrical pilot surface 176 on the annular web adapter.

FIG. 8 shows the portion of FIG. 5 enclosed within the circle identified by reference character 8 in FIG. 5 and illustrates an arrangement for laterally shifting the collars 122 from their retracted to their extended positions. More particularly, the inboard hub 124 of the collar 122 has screw threads 180 formed on the outer cylindrical surface thereof. An actuator sleeve 182 is disposed around the inboard hub and includes an internally threaded bore 184 screwed onto the threads 180 and a radially extending flange 186. An annular retainer 188 around the actuator sleeve is bolted to the right side 88 of the transmission with an inturned lip 190 overlapping the flange 186. The actuator sleeve 182 is restrained laterally but is rotatable about the sprocket axis 46. When the actuator sleeve is rotated relative to the inboard hub 124 by any convenient arrangement, not shown, the inboard hub and the collar 122 are displaced laterally between the extended and retracted positions.

The embodiments of the invention in which an exclusive property or privilege is claimed are defined as follows:

1. In a track laying vehicle including
   a hull having a compartment therein defined on opposite sides by a pair of laterally spaced vertical hull walls and a fore and aft access to said compartment,
   means on each said hull walls defining an aperture therein aligned on a transverse sprocket axis of said hull,
   a transmission having a case with a pair of vertical sides and a transverse axis perpendicular to said sides, and
   means for translating said transmission longitudinally through said fore and aft access into and out of said compartment and for temporarily supporting said transmission in an installed position in said compartment wherein said sprocket axis and said transverse axis coincide and each of said transmission case vertical sides is adjacent a corresponding one of said vertical hull walls,
   a transmission mounting comprising:
   a pair of web adapters each rigidly attached to a corresponding one of said vertical hull walls in a corresponding one of said hull wall apertures,
   means on each of said web adapters defining a cylindrical pilot surface in a corresponding one of said hull wall apertures aligned on said sprocket axis,
   means on said transmission case defining a cylindrical boss on each of said transmission case vertical sides aligned on said transverse axis of said transmission,
   a pair of collars slidably disposed on respective ones of said bosses for bodily shiftable movement between laterally inboard retracted positions and laterally outboard extended positions, and
   means on each of said collars defining a cylindrical bearing surface engageable on the corresponding one of said cylindrical pilot surfaces in said installed position of said transmission and said extended positions of said collars whereby said transmission is supported on said vertical hull walls at said coincident transverse and sprocket axes when said temporary support is removed.

2. The transmission mounting recited in claim 1 wherein
   each of said web adapters is rigidly attached to the corresponding one of said vertical hull walls in substantially flush relationship to an inner surface thereof facing said transmission case.

3. The transmission mounting recited in claim 2 and further including
   locking means on each of said web adapters and on each of said collars engageable in said extended positions of said collars and operative to maintain each of said collars in said extended position.

4. The transmission mounting recited in claim 3 wherein each of said collars includes
   a cylindrical inner hub defining an internal cylindrical journal slidably disposed on a corresponding one of said transmission case bosses,
   a frustoconical body integral with said inner hub,
   a lip integral with said frustoconical body, and means on said lip defining said cylindrical bearing surface engageable on the corresponding one of said pilot surfaces.

5. The transmission mounting recited in claim 4 wherein each of said locking means includes
   an annular lug plate having a plurality of lugs thereon disposed at intervals around said lug plate,
   means rigidly attaching said lug plate to said web adapter in alignment with said sprocket axis,
   means on said web adapter defining a groove providing a relief space behind said lug plate, and
   means on said collar lip defining a plurality of lugs corresponding in number to the number of said lug plate lugs and spaced at intervals around said lip,
   said lugs on said lip passing between said lug plate lugs and into said relief space when said collar achieves said extended position so that said collar is rotatable about said sprocket axis relative to said lug plate to a position wherein said lugs on said lip are disposed behind corresponding ones of said lug plate lugs.

6. The transmission recited in claim 5 wherein
   said cylindrical pilot surface on each of said web adapters in an internal cylindrical surface and said cylindrical bearing surface on said lip on each of said collars is an external cylindrical surface.

7. The transmission recited in claim 5 wherein
   said cylindrical pilot surface on each of said web adapters is an external cylindrical surface and said cylindrical bearing surface on said lip on each of said collars is an internal cylindrical surface.

* * * * *